United States Patent
Koreeda et al.

(10) Patent No.: US 8,678,667 B2
(45) Date of Patent: Mar. 25, 2014

(54) OPTICAL CONNECTOR

(75) Inventors: Yuichi Koreeda, Tokyo (JP); Naoki Katagiyama, Tokyo (JP); Yoshikazu Namekawa, Ibaraki (JP); Yoshinori Kurosawa, Ibaraki (JP); Seiji Kojima, Ibaraki (JP)

(73) Assignees: Japan Aviation Electronics Industry, Limited, Tokyo (JP); Hitachi Metals, Ltd., Tokyo (JP)

( * ) Notice: Subject to any disclaimer, the term of this patent is extended or adjusted under 35 U.S.C. 154(b) by 105 days.

(21) Appl. No.: 13/416,446

(22) Filed: Mar. 9, 2012

(65) Prior Publication Data

US 2012/0321252 A1 Dec. 20, 2012

(30) Foreign Application Priority Data

Jun. 15, 2011 (JP) ................. 2011-133024

(51) Int. Cl.
*G02B 6/38* (2006.01)
(52) U.S. Cl.
USPC ........................................................... 385/59
(58) Field of Classification Search
USPC ................................................... 385/53–59
See application file for complete search history.

(56) References Cited

U.S. PATENT DOCUMENTS

| | | | |
|---|---|---|---|
| 4,952,263 A * | 8/1990 | Kakii et al. | 156/153 |
| 6,074,577 A * | 6/2000 | Katsura et al. | 264/1.25 |
| 6,234,681 B1 * | 5/2001 | Shahid | 385/65 |
| 7,052,187 B2 | 5/2006 | Ohtsuka et al. | |
| 2006/0067626 A1 * | 3/2006 | Takeda et al. | 385/53 |

FOREIGN PATENT DOCUMENTS

| | | |
|---|---|---|
| EP | 0730175 | 12/1996 |
| EP | 1039323 | 9/2000 |
| JP | 08-313762 | 11/1996 |
| JP | 09-015453 | 1/1997 |
| JP | 2004-045966 | 2/2004 |
| JP | 3714337 | 11/2005 |

OTHER PUBLICATIONS

China Office action, dated Dec. 30, 2013 along with an english translation thereof.

* cited by examiner

*Primary Examiner* — Ryan Lepisto
*Assistant Examiner* — Erin Chiem
(74) *Attorney, Agent, or Firm* — Greenblum & Bernstein, P.L.C.

(57) ABSTRACT

In an optical connector, end faces of a pair of ferrules that hold multiple optical fibers are positioned with two guide pins and butted against each other to connect the optical fibers in the pair of ferrules. The optical connector is provided with an urging member for pushing the end faces against each other. The end faces are ground at an angle. The gap between the guide pins and guide holes, which open at the end faces and into which the guide pins are fitted, is larger than 0.004 mm and smaller than or equal to 0.008 mm. Powder caused by the friction generated when the guide pins are inserted and fitted into the guide holes is greatly reduced. Connection loss does not increase even when frequent connection and disconnection are performed, and cleaning the connector becomes unnecessary.

3 Claims, 6 Drawing Sheets

OPTICAL CONNECTOR

BACKGROUND OF THE INVENTION

1. Field of the Invention

The present invention relates to an optical connector, and more particularly, to an optical connector that employs a guide-pin positioning method, such as an MT optical connector stipulated in Japanese Industrial Standard (JIS) C 5981.

2. Description of the Related Art

MT optical connectors stipulated in JIS C 5981 employ the guide-pin positioning method to provide precise positioning and butt connection. FIG. 1A shows the structure of an MT optical connector. A ferrule 11 has a pair of guide holes 12 opening at an end face 11a and optical fiber holes 13 disposed between the pair of guide holes 12.

A pair of guide pins 14 is inserted and fitted into the guide holes 12 of one ferrule 11 so as to protrude from the end face 11a, as shown in FIG. 1A. These protruding guide pins 14 are inserted and fitted into the guide holes 12 of the other ferrule 11, and the end faces 11a of the pair of ferrules 11 are butted against each other. Then, optical fibers 15 accommodated and precisely positioned in the optical fiber holes 13 are butted against each other and connected at the end faces 11a of both ferrules 11.

A clamp spring 16 made of a leaf spring member is mounted so as to sandwich the pair of ferrules 11. With this, the end faces 11a of the pair of ferrules 11 are pushed against each other with a predetermined pushing force. FIG. 1B shows a state in which the clamp spring 16 has been mounted and the optical connector connection has been completed. In FIGS. 1A and 1B, optical fiber tapes 17 are formed by bonding a plurality of (for example, eight) optical fibers (optical fiber core wires) 15 to each other with a resin to unite them. The ferrules 11 are mounted to ends of the optical fiber tapes 17.

FIG. 2 shows the structure of an optical connector described in Japanese Patent Application Laid Open No. 2004-45966 (hereafter called Literature 1). The structure of this optical connector conforms to that of MT optical connectors stipulated in JIS C 5981. Components corresponding to those shown in FIG. 1A are assigned the same symbols as those in FIG. 1A.

The optical connector shown in FIG. 2 has escape faces 11b at end faces 11a of a pair of ferrules 11 that are butted against each other. The escape faces 11b are curved surfaces and are formed in all portions except for a portion where optical fiber holes (not shown) are formed (around the portion where the optical fiber holes are formed). Guide holes 12 open at the escape faces 11b.

If foreign matter such as dirt or dust gets stuck on the end faces 11a of the ferrules 11, the connection loss increases when the ferrules 11 are butted against each other for connection. Therefore, foreign matter should be cleared or removed. Foreign matter that gets stuck around the guide pins 14 may remain because it is difficult to remove it due to the positions of the guide pins 14.

The optical connector shown in FIG. 2 copes with this difficulty well. Since the guide holes 12 open at the escape faces 11b, even if foreign matter 21 such as dirt or dust remains around the guide pins 14, as shown in FIG. 2, the foreign mater 21 does not affect the connection. Portions where the optical fibers are disposed can be butted against each other to be connected without any gap between the end faces 11a of the ferrules 11.

MT optical connectors shown in FIGS. 1A and 1B have been used conventionally for trunk line systems such as public communication line networks. In recent years, MT optical connectors have come to be used for signal connections between electronic units that use optical signals. The range of applications has expanded.

When MT optical connectors are used in a trunk line system, basically, repeated connection and disconnection of the MT optical connectors hardly occur. It is easily expected, however, that connection and disconnection of MT optical connectors are frequently repeated in general electric consumer appliance fields for connecting electronic devices.

Assuming that the connection and disconnection of MT optical connectors conforming to JIS C 5981 are frequently repeated, changes in connection loss that occurred as a result of repeated connection and disconnection were examined. In JIS C 5981, the guide hole diameter and the guide pin diameter of MT optical connectors are stipulated as follows:

Guide hole diameter: 0.700±0.001 mm
Guide pin diameter: 0.698±0.001 mm

In a connection and disconnection test, the diameters of the guide holes of ferrules to be used and the diameters of guide pins were measured. A pair of ferrules having a guide hole diameter of 0.700 mm and two guide pins having a diameter of 0.698 mm were used in the test. A clamp spring connection method was used and the number of times the ferrules were connected and disconnected was set to 2,000.

FIG. 3 shows the results of the connection and disconnection test. The connection loss was not constant and frequently increased (worsened). Every time the connection loss increased, the end faces 11a of the ferrules 11 were cleaned, and then the test was continued.

It is understood from FIG. 3 that the connection loss increased about once every 100 connections and disconnections. It is also understood that a very large connection loss which may impair the connection performance sometimes occurred suddenly.

The reason why such changes in connection loss occurred was checked, and it was found that powder caused by the friction generated when the guide pins were inserted and fitted into the guide holes got stuck at the optical fiber end faces or caused fitting failures. This is because the gaps between the guide pins and the guide holes were very small, providing precise fitting.

The optical connector described in Literature 1, described above, is provided with the escape face 11b at the end face 11a of a ferrule 11 against which another ferrule 11 is butted. The guide holes 12 are made to open at this escape face 11b to avoid an increase in butting failures and connection loss caused especially by foreign matter 21, such as dirt or dust, which gets stuck or remains after cleaning around the guide pins 14.

In Literature 1, however, no description is given regarding the production of powder caused by the friction generated when the guide pins are inserted and fitted into the guide holes. Since the guide pins and the guide holes conforming to the JIS are used in Literature 1, the production of powder caused by the friction generated by repeated connection and disconnection cannot be avoided.

To avoid an increase in connection loss caused by the production of such powder due to friction, it is necessary to frequently clean the end faces of the ferrules, for example. However, frequent cleaning is troublesome, and asking ordinary users to perform such cleaning is not appropriate for optical connectors designed for commercial use. It is difficult to stipulate that cleaning is a condition of use.

SUMMARY OF THE INVENTION

In consideration of the above described problems, an object of the present invention is to provide optical connectors capable of greatly reducing powder caused by the friction generated when guide pins are inserted and fitted into the guide holes, thereby preventing connection loss from increasing even if frequent connection and disconnection are performed and also allowing cleaning to be eliminated.

According to the present invention, an optical connector in which end faces of a pair of ferrules each holding a plurality of optical fibers are positioned with two guide pins and butted against each other to connect the optical fibers held by the pair of ferrules are provided with an urging member for pushing the end faces against each other. The end faces are ground at an angle. The gap between the guide pins and guide holes, which open at the end faces and into which the guide pins are fitted, is larger than 0.004 mm and equal to or smaller than 0.008 mm.

According to the present invention, the production of powder caused by the friction generated when the guide pins are inserted and fitted into the guide holes is greatly reduced. Connection loss does not increase (worsen) even when frequent connection and disconnection are performed, providing stable connection performance. In addition, it becomes unnecessary to clean the connector.

DETAILED DESCRIPTION OF THE PREFERRED EMBODIMENTS

Figure 1A:
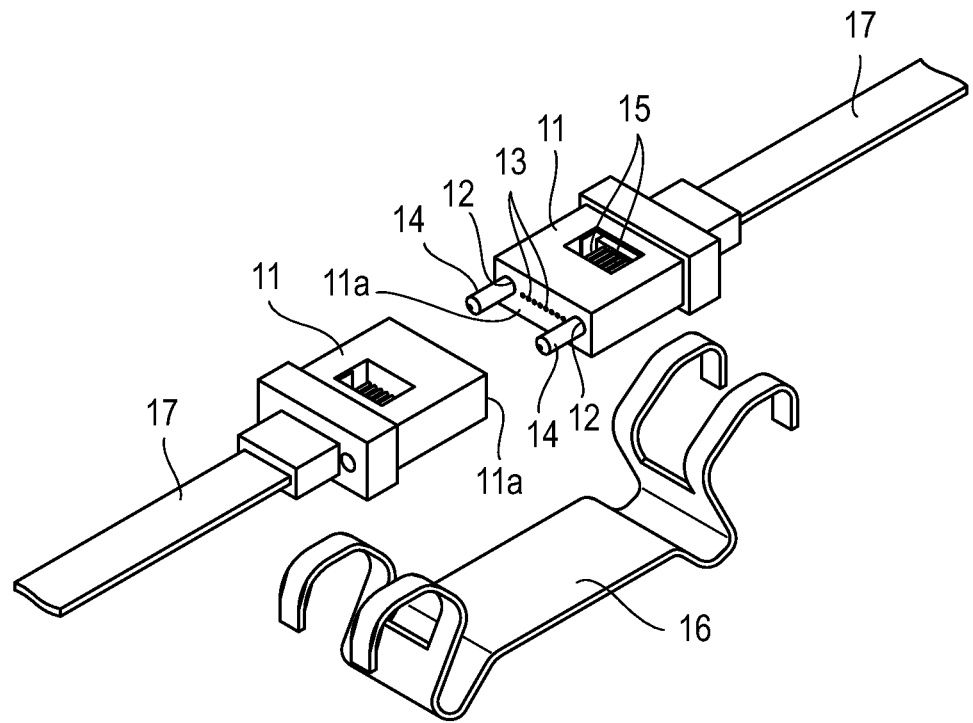
FIG. 1A is a perspective view showing an MT optical connector before connection.
Figure 1B:
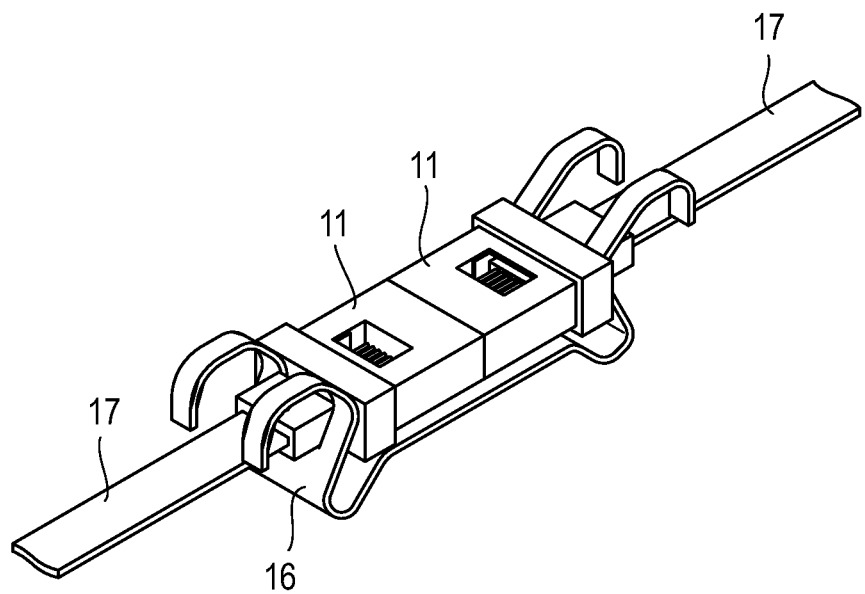
FIG. 1B is a perspective view showing the connection state of the MT optical connector shown in FIG. 1A.
Figure 2:
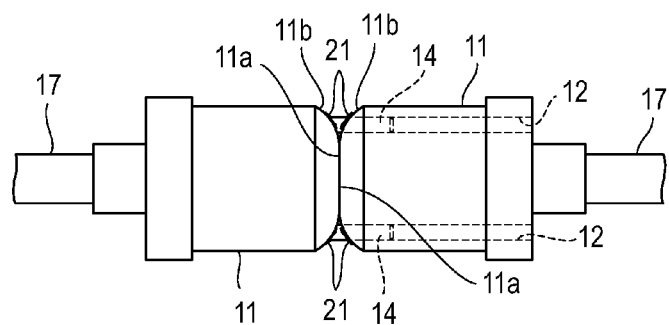
FIG. 2 is a plan of a conventional optical connector.
Figure 3:
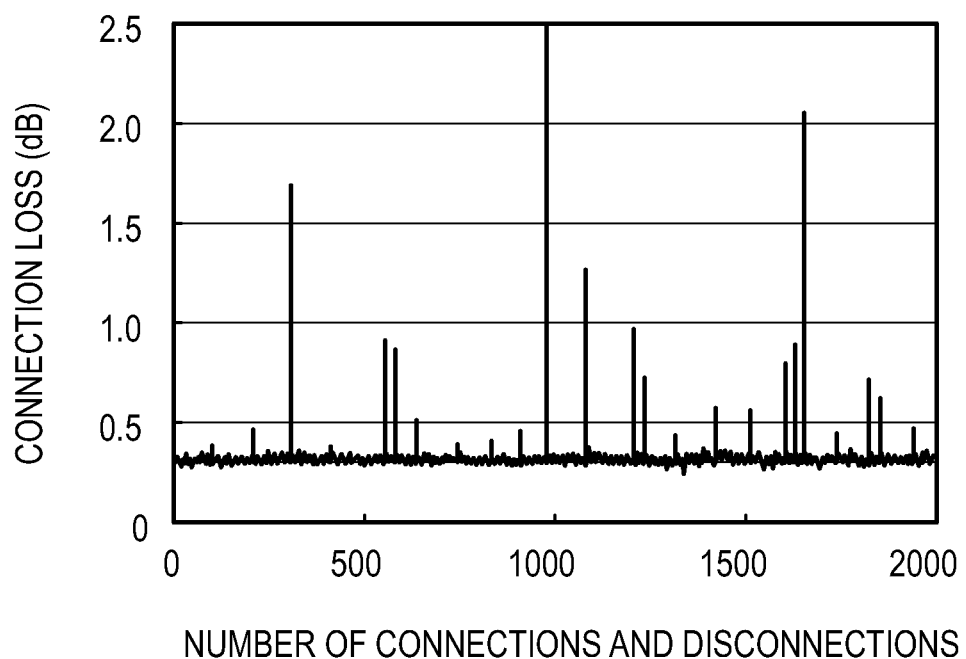
FIG. 3 is a graph showing conventional changes in connection loss versus the number of connections and disconnections.

In the present invention, end faces of a pair of ferrules that hold multiple multimode optical fibers (core diameter: 50 μm) are positioned with two guide pins and butted against each other to connect the optical fibers held by the pair of ferrules in an optical connector, such as the MT optical connector shown in FIG. 1A and FIG. 1B, described earlier. The end faces at which the ferrules are butted against each other are ground at an angle. The gap between the guide pins and guide holes into which the guide pins are fitted is made larger than in conventional connectors.

Embodiments of the present invention will be described below with an MT optical connector taken as an example.

Figure 4:
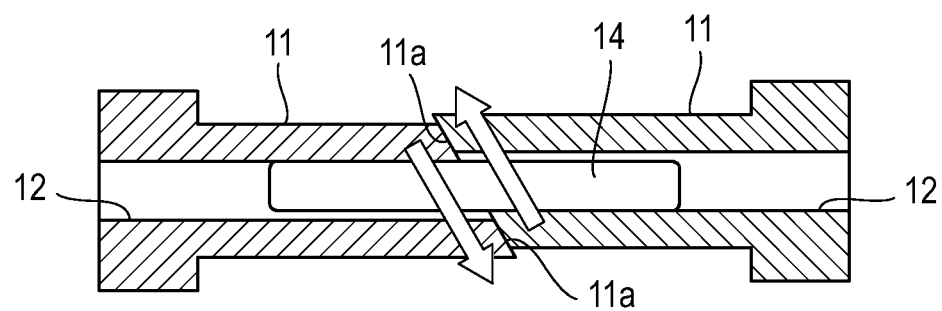
FIG. 4 is a view showing the structure and the connection state of an optical connector according to an embodiment of the present invention.

FIG. 4 shows a state in which end faces 11a of a pair of ferrules 11 of an MT optical connector are ground at an angle, are positioned with guide pins 14, and are butted against each other for connection.

The pair of ferrules 11 are sandwiched by a clamp spring (see FIG. 1A), which is not shown in FIG. 4. The clamp spring generates a pushing force to push the end faces 11a against each other, so that the ferrules 11 are shifted in directions indicated by arrows in FIG. 4 and connected. In other words, inclined grinding restricts the directions of the shifts of the optical axes of the optical fibers held by the ferrules 11 to specific directions.

In contrast, in the conventional MT optical connectors, since the end faces 11a of the ferrules 11 are ground perpendicularly to the optical axes of the optical fibers, the positional shifts of the optical axes can occur in any directions in the XY plane formed by the end faces 11a. Therefore, inclined grinding makes the optical axis shifts smaller than perpendicular grinding. Thus, changes in connection loss caused by frequent connection and disconnection of the MT optical connector can be reduced. The angle of inclined grinding is set, for example, to eight degrees. With such inclined grinding, matching oil conventionally used between the end faces 11a becomes unnecessary.

Figure 5:
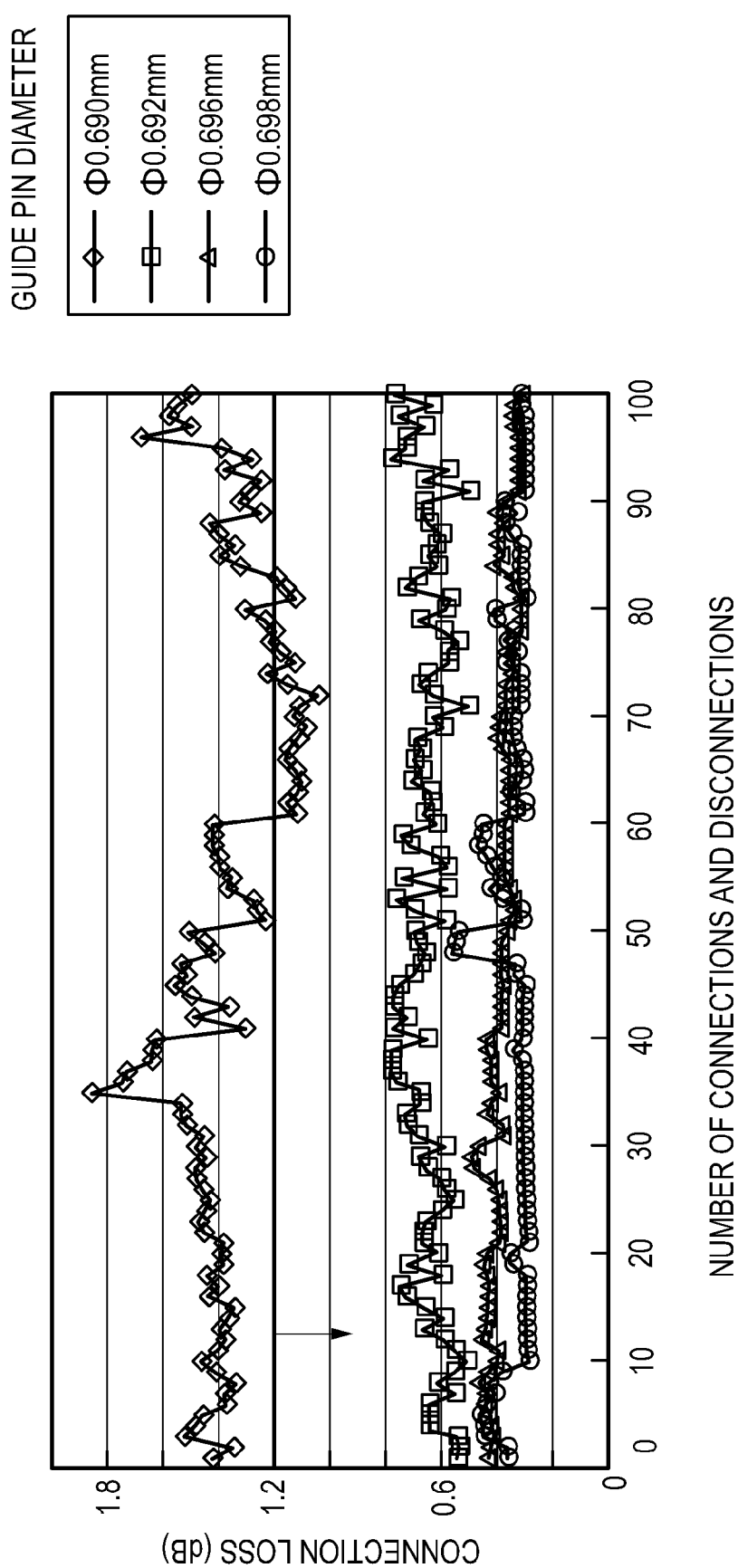
FIG. 5 is a graph showing the relationship between connection loss and the number of connections and disconnections, for different guide pin diameters.

FIG. 5 shows the relationship between connection loss and the number of connections and disconnections of the MT optical connector when the diameter of the guide pins is changed. The pair of ferrules 11 used here had a guide hole diameter of 0.700 mm (measured value), which is the standard dimension stipulated in JIS C 5981. The end faces 11a were ground at an angle. Four guide pins 14 having diameters of 0.690 mm, 0.692 mm, 0.696 mm, and 0.698 mm (measured values) were used to check the connection loss. The wavelength of light used in the measurement was 850 nm. A clamp spring was used for connection.

A connection loss of 1.2 dB or less is stipulated in JIS C 5981. It was found that the JIS requirement was satisfied when the guide pins having a diameter of 0.692 mm were used, which showed a larger connection loss than when the guide pins having a diameter of 0.696 mm or 0.698 mm were used.

Figure 6:
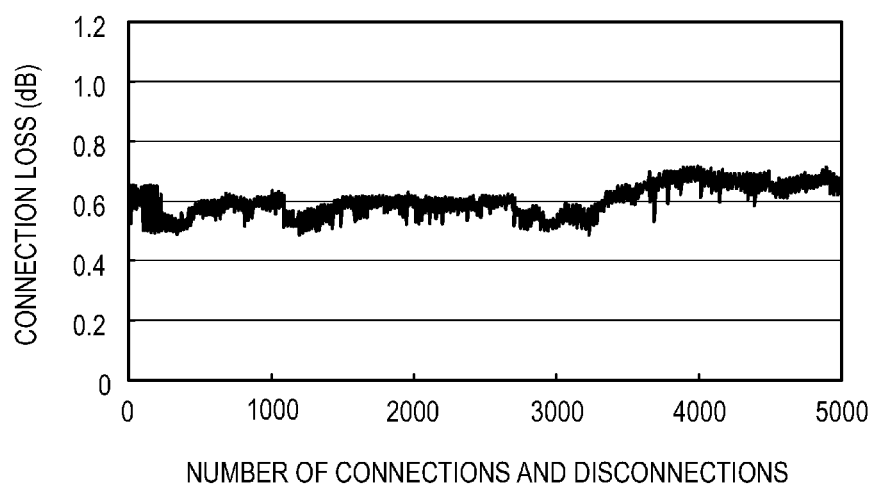
FIG. 6 is a graph showing changes in connection loss versus the number of connections and disconnections of the optical connector according to the embodiment of the present invention.

FIG. 6 shows the relationship between the connection loss and the number of connections and disconnections of the MT optical connector, with the number being increased to 5,000. Guide pins 14 having a diameter of 0.694 mm (measured value) were used, and the ferrules 11 had guide holes with a diameter of 0.700 mm (measured value). It is understood from FIG. 6 that changes in connection loss were small and stable, and that a large connection loss change that would have impaired the connection performance (that would not have satisfied the JIS requirement) did not occur.

The results obtained in FIG. 6 are caused by a great reduction in the amount of powder caused by the friction generated when the guide pins were inserted and fitted into the guide holes 12, when the guide pins having small diameters were used to increase the gap between the guide holes 12 and the guide pins 14.

Based on the above results, the present invention provides a larger gap between the guide holes 12 and the guide pins 14. From the following settings in JIS C 5981, Guide hole diameter: 0.700±0.001 mm
Guide pin diameter: 0.698±0.001 mm the gap ranges from 0 to 0.004 mm. In the present invention, the gap C is set as follows:

$$0.004 < C \leq 0.008 \text{ (mm)}$$

The end faces 11a of the ferrules 11 are ground at an angle and pushed against each other by an urging member such as a clamp spring.

As described above, the gap between the guide holes 12 and the guide pins 14 is made larger in the present invention than in the JIS. With this setting, the connection loss basically becomes large. Although the initial connection loss is worse than before slightly, the amount of powder caused by the friction even when repeated connection and disconnection are performed is reduced. Therefore, large changes (deterioration) in connection loss due to the powder caused by friction can be prevented, and cleaning the connectors becomes unnecessary.

The guide pin diameter D is set, for example, to 0.694±0.001 mm. In that case, the guide hole diameter d is made to almost conform to the dimensions stipulated in the JIS from the range of the gap C as follows:

$$0.699 < d \leq 0.701 \text{ (mm)}$$

In contrast, when the guide hole diameter d is set, for example, to 0.704±0.001 mm, the guide pin diameter D is made to almost conform to the dimensions stipulated in the JIS from the range of the gap C as follows:

$$0.697 \leq D < 0.699 \text{ (mm)}$$

The foregoing description was made with an MT optical connector taken as an example. The present invention is not limited to MT optical connectors. For example, the present invention can also be applied to MPO optical connectors stipulated in JIS C 5982.

Figure 7:
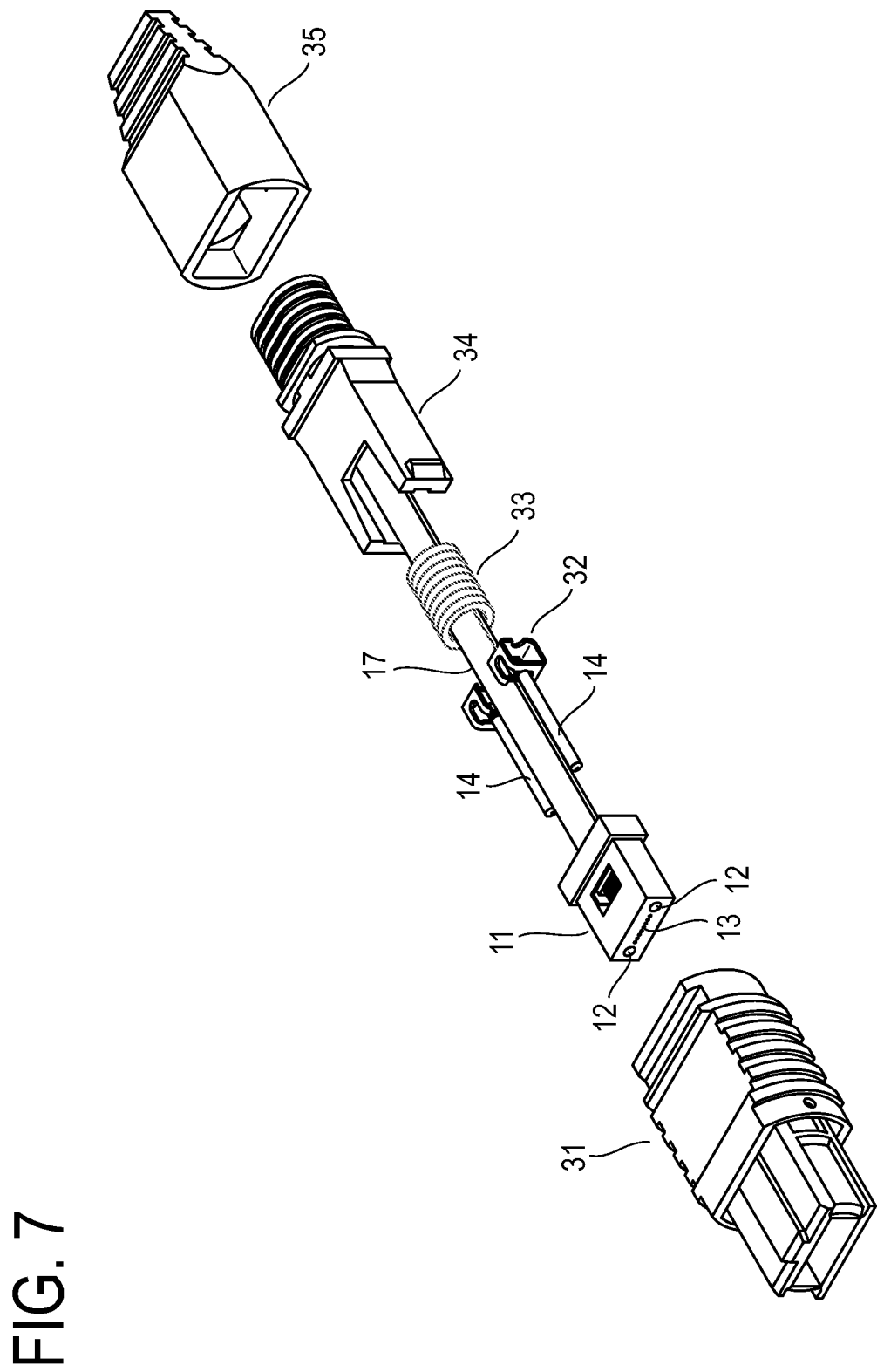
FIG. 7 is an exploded perspective view showing the structure of an MPO optical connector to which the present invention can be applied.

FIG. 7 is an exploded view of the structure of an MPO optical connector. The MPO optical connector uses the same ferrule 11 as the MT optical connectors, and two guide pins 14. The ferrule 11 is mounted at an end of an optical fiber tape 17. FIG. 7 also shows a housing 31; a metal clamp 32 for holding one end of the two guide pins 14; a coil spring 33; a stopper 34; and a boot 35. In the MPO optical connector, the ferrule 11 is urged by the coil spring 33 to receive a pushing force.

What is claimed is:

1. An optical connector in which end faces of a pair of ferrules each holding a plurality of optical fibers are positioned with two guide pins and butted against each other to connect the optical fibers held by the pair of ferrules, the optical connector comprising an urging member for pushing the end faces against each other, the end faces being ground at an angle, and the gap between the guide pins and guide holes, which open at the end faces and into which the guide pins are fitted, being larger than 0.004 mm and smaller than or equal to 0.008 mm.

2. The optical connector according to claim 1, wherein the diameter of the guide pins is set to 0.694±0.001 mm.

3. The optical connector according to claim 1, wherein the diameter of the guide holes is set to 0.704±0.001 mm.

* * * * *